Patented Aug. 14, 1945

2,382,031

UNITED STATES PATENT OFFICE 2,382,031

ETHER OF 2-METHYL-2-HYDROXY-BUTENE-3

Frank J. Soday, Swarthmore, Pa., assignor to The United Gas Improvement Company, a corporation of Pennsylvania No Drawing. Application December 24, 1942,
Serial No. 470,077

1 Claim. (Cl. 260—614)

This invention relates to a new composition of matter, and to methods for its preparation.

More particularly, this invention pertains to isoprene ether and to methods for the preparation of this compound.

By the term "isoprene ether" is meant an ether which may be regarded as a derivative of isoprene alcohol or, more correctly, dimethyl vinyl carbinol or 2-methyl-2-hydroxy-butene-3.

This invention is based upon the discovery that isoprene ether having the formula $$\begin{array}{c} CH_3 \\ | \\ CH_3-C-CH=CH_2 \\ | \\ O \\ | \\ CH_3-C-CH=CH_2 \\ | \\ CH_3 \end{array}$$

may be prepared from isoprene alcohol or from other isoprene derivatives, such as isoprene monohydrohalides, by reactions to be more particularly described herein.

An object of the present invention is the provision of a new composition of matter, namely, isoprene ether, and processes for the preparation thereof. Another object of this invention is the provision of a new compound having utility in the chemical industry, particularly in the preparation of synthetic resins, plastics, and elastomers. Other objects and advantages of the invention will be apparent to those skilled in the art upon an inspection of the specification and claims.

Isoprene, having the general formula $$CH_2=\overset{CH_3}{\underset{|}{C}}-CH=CH_2$$

is the basic component in the preparation of the new composition of matter, described herein, namely, isoprene ether. It may be obtained from various sources, such as synthetically from the pyrogenic decomposition of rubber, from terpenes, or from fractions obtained upon the fractionation of condensates obtained in the manufacture of carburetted water gas, oil gas, refinery gas, or coke oven gas, or from similar sources. Such fractions will be referred to herein, generally, as light oil isoprene fractions. Isoprene fractions obtained in the manufacture of oil gas are particularly preferred.

Hydrocarbon fractions containing from 5 to 100% of isoprene may be successfully used in the production of isoprene ether, although in general the use of fractions containing from 50 to 100% isoprene is preferred for the production of products of high quality.

In general, the initial step in the preparation of isoprene ether is the conversion of isoprene into a monohydrohalogen derivative.

The preparation of the hydrogen halide derivative may be effected in a number of ways.

For instance, liquid or gaseous hydrogen halide may be introduced into isoprene, or into an isoprene fraction, by means of a porous tube, or a pipe containing a porous cap, or otherwise.

On the other hand, liquid or gaseous hydrogen halide may be contacted with liquid or gaseous isoprene, or an isoprene fraction, in a kettle, or in an open or packed tower, or otherwise.

The reactants may be contacted in any desired manner, for instance, concurrently, or countercurrently, or in a static system.

I prefer to employ hydrogen chloride as the hydrogen halide. However, other hydrogen halides such as hydrogen bromide also may be employed.

When a hydrogen halide, for example, hydrogen chloride, is added to isoprene, the following reaction is assumed to take place.

$$H_2C=\overset{CH_3}{\underset{|}{C}}-CH=CH_2+HCl \rightarrow H_3C-\overset{CH_3}{\underset{|}{\underset{Cl}{C}}}-CH=CH_2$$

Isoprene    Hydrogen chloride    Tertiary isoprene monohydrochloride

The unstable tertiary chloride thus formed, namely, 2-methyl 2-chlorobutene-3, presumably changes, at least in part, on standing to a primary chloride, namely, 2-methyl-4-chlorobutene-2, having the following formula:

$$H_3C-\overset{CH_3}{\underset{|}{C}}=CH-CH_2Cl$$

Primary isoprene monohydrochloride however, there is some evidence that in the case of the chloride, as distinguished from the bromide, this rearrangement does not take place in large part, if at all.

Isoprene monohydrohalides may be prepared in the following manner.

*Example 1*

An isoprene fraction containing 70% by weight of isoprene was obtained by the fractionation of condensate obtained in the manufacture of oil gas.

This fraction also contained some olefines boiling in the same range and possibly some piperylene and cyclopentadiene. Isoprene fractions of lower concentration may contain considerable quantities of these materials.

A quantity equivalent to approximately 3,000 parts by weight of this fraction was cooled to approximately 0° C., whereupon a stream of dry hydrogen chloride was introduced into the isoprene fraction over a period of 50 hours, the temperature being maintained at approximately 0° C., throughout the entire time.

The mixture was then allowed to stand overnight and was then distilled.

That portion of the distillate boiling within the range of 90 to 110° C. was collected as isoprene monohydrochloride.

That portion of the distillate boiling below 90° C. at atmospheric pressure and comprising for the most part unchanged isoprene, was retreated and distilled in the same manner. The distillate collected between 90 and 110° C. at atmospheric pressure was combined with the first distillate.

There was thus obtained a quantity of isoprene monohydrochloride equivalent to approximately 3,000 parts by weight. This fraction of isoprene monohydrochloride had the following physical properties:

Density (d 20/4) =0.9069
Refractive index (n 20/D) =1.43225

A quantity equivalent to approximately 1,100 parts by weight of hydrogen chloride was absorbed. This corresponds with the theoretical quantity required to add hydrogen chloride to one of the double bonds of the isoprene contained in the given quantity of starting material.

The preparation of isoprene monohydrohalide in the above manner may be carried out at any suitable temperature.

Temperatures between —60 and 36° C. may be employed for the production of isoprene monohydrohalide in the liquid phase, isoprene boiling at the upper temperature limit indicated.

On the other hand, if desired, the reaction may be carried out in the vapor phase by employing temperatures above 36° C. However, there are limiting factors, such as the tendency of isoprene to form isoprene dihydrohalide, which may or may not be desired, or to polymerize at elevated temperatures in the presence of an acid catalyst.

In general, it is preferred to carry out the reaction in the liquid phase, while employing temperatures between —60° and 10° C.

If desired, halogenating catalysts may be employed to accelerate the addition of hydrogen halide to the isoprene molecule. Examples of halogenating catalysts are methyl alcohol and acetone.

The isoprene monohydrohalide thus obtained, namely the distillate boiling between 90° C. and 110° C. at atmospheric pressure or, if desired, the crude reaction product prior to distillation, or any fraction thereof, whether narrower or wider than the above fraction, may be employed in the preparation of isoprene ether, although a fairly pure material is generally preferred.

Isoprene ether may be prepared, among other ways, by (a) reacting a metallic salt of isoprene alcohol, such as the sodium isoprene alcoholate, with an isoprene monohydrohalide; (b) the partial dehydration of isoprene alcohol, suitably by the use of a weak acid such as dilute sulfuric acid or benzene sulfonic acid; or (c) by the reaction of isoprene alcohol with an isoprene monohydrohalide, suitably in the presence of an alkali.

Methods (a) and (b) are preferred processes for the preparation of isoprene ether.

The conversion of isoprene monohydrohalide into isoprene alcohol may be effected in any desired manner. Thus, for example, the isoprene monohydrohalide may be hydrolyzed with aqueous alkaline solutions such as sodium hydroxide, potassium hydroxide, sodium carbonate, sodium bicarbonate, calcium hydroxide, and similar reagents. In general, the use of mild alkalis such as sodium carbonate at moderate temperatures such as, for example, between 30 and 100° C. and at moderate pressures such as, for example, between 1 to 2 atmospheres is preferred.

If desired, hydrolysis may be effected in the presence of a suitable solvent, such as, for example, toluene.

Upon hydrolysis of the halide, it is believed that a molecular rearrangement takes place as follows:

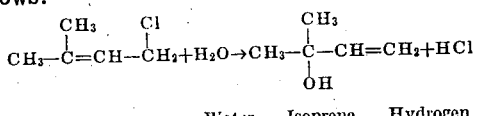

Isoprene monohydrochloride    Water    Isoprene alcohol    Hydrogen chloride provided the rearrangement of tertiary isoprene monohydrochloride to primary monohydrochloride actually takes place. If not, then this step comprises the hydrolysis of the tertiary form.

The isoprene alcohol obtained in this manner may be refined by fractionation, or otherwise, or, if desired, the alcohol may be directly employed in the preparation of isoprene ether without refining. However, the former is frequently preferred.

The preparation of isoprene alcohol is illustrated in the following example.

*Example 2*

A quantity of isoprene monohydrochloride equivalent to 2,000 parts by weight was stirred for four hours at room temperature with 17,000 parts by weight of a 15% sodium carbonate solution. Carbon dioxide was steadily evolved during the reaction. The isoprene monohydrochloride, which was present as an oily layer, gradually disappeared.

The reaction product was extracted with ether, and the ether removed by distillation. The extracted material thus obtained was fractionated to isolate isoprene alcohol.

There was thus obtained approximately 400 parts by weight of isoprene alcohol having the following physical properties:

Boiling point 95–100° C. at 760 mm.
Density (d 20/4) =0.8255
Refractive index (n 20/D) =1.41446

As pointed out previously, isoprene ether may be prepared by (a) the reaction of a metallic derivative of isoprene alcohol with an isoprene monohydrohalide

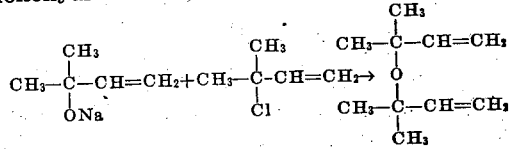

(b) by the partial dehydration of isoprene alcohol

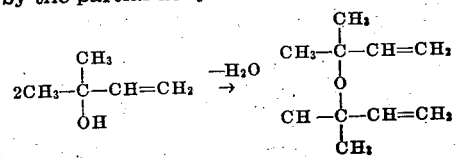

or (c) by the reaction of isoprene alcohol with an isoprene monohydrohalide

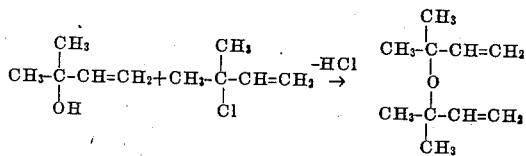

While in method (a), any desired metallic derivative of isoprene alcohol may be employed, I generally prefer to use an alkali or alkaline earth metal for this purpose. Excellent results are obtained by the use of the sodium derivative of isoprene alcohol.

In method (b) the use of relatively weak acids, or dilute solutions of strong acids, is preferred due to the tendency of the isoprene alcohol to completely dehydrate, forming isoprene. I generally prefer to use aqueous solutions of mineral acids containing less than 75% of the acid, such as a 50% aqueous solution of sulfuric acid; organic acids; or organic-substituted mineral acids, such as benzene sulfonic acid, for this purpose.

In method (c), the use of mild alkalies or alkaline agents to neutralize the hydrogen halide generated is preferred.

Any desired isoprene monohydrohalide may be employed in reactions (a) and (c), although I prefer to use isoprene monohydrochloride.

The invention may be more particularly described by means of the following examples.

*Example 3*

A 46 gram portion of metallic sodium in the form of sodium wire was added to 344 grams of isoprene alcohol, after which the mixture was permitted to stand for several hours. The mixture then was heated on the steam bath and a total of 209 grams of isoprene monohydrochloride slowly added. When the addition of the isoprene monohydrochloride had been completed, the mixture was refluxed for a period of 2 hours, after which it was filtered and distilled to remove unreacted material and low boiling by-products. The residue was fractionated under reduced pressure, resulting in the isolation of the isoprene ether. This particular sample had the following physical properties Boiling range @ 9 mm. of mercury, absolute=54–59° C.
Density ($d\ 20/4$) =0.8489
Refractive index ($n\ 20/D$) =1.4435.

*Example 4*

A mixture of 200 grams of isoprene alcohol and 3 grams of benzene sulfonic acid was refluxed for a period of 6½ hours, the water forming as a result of the partial hydrolysis being continuously collected and discarded, the isoprene alcohol volatilizing simultaneously being returned to the reaction flask. The reaction mixture was cooled, washed with water to remove the catalyst, and distilled to remove unreacted material and low-boiling by-products.

The isoprene ether obtained had the following physical properties.

Boiling range @ 9 mm. of mercury, absolute= 55–70° C.
Density ($d\ 20/4$) =0.8307
Refractive index ($n\ 20/D$) =1.44617.

The physical properties of isoprene ether will vary somewhat, depending mainly upon the degree of purity of the isoprene derivatives employed in its preparation. As these intermediates usually are prepared from isoprene fractions containing appreciable quantities of amylenes, the principal impurities present in the isoprene ether prepared from light oil isoprene fractions are amyl ethers or mixed amyl-isoprene ethers.

The presence of such impurities generally does not adversely affect the commercial utilization of the isoprene ether. I find that isoprene ethers are of a satisfactory degree of purity for most applications when they boil within the range of 40–80° C., and more particularly 50–70° C., at 9 mm.; have densities ($d\ 20/4$) in the range of 0.825 to 0.855, and more particularly in the range of 0.830 to 0.850; and refractive indices ($n\ 20/D$) in the range of 1.441 to 1.448, and more particularly in the range of 1.443 to 1.447.

Isoprene ether may be used for a variety of purposes due to its unique properties. As it possesses two reactive double bonds, it may be used in the preparation of numerous chemical derivatives, in the production of synthetic resins and plastics, and in the production of synthetic rubbers or elastomers.

In the specification and in the claims, the term "hydrogen halide" embraces hydrogen chloride, hydrogen bromide, and hydrogen iodide. The term "isoprene monohydrohalide" embraces the isoprene derivatives of these hydrogen halides. The term "isoprene" includes pure isoprene, technical and commercial grades thereof, isoprene solutions and/or mixtures, and hydrocarbon fractions containing isoprene. The term "isoprene derivative" is intended to include the hydroxyl derivative of isoprene, the metallic derivative of the said hydroxyl derivative, and the monohydrohalides of isoprene.

While reagents and procedures of a particular nature have been specifically described, it is to be understood that these are given by way of illustration only. Therefore, changes, omissions, additions, substitutions, and/or modifications might be made within the scope of the claims without departing from the spirit of the invention, which is intended to be limited only as required by the prior art.

I claim:

As a new composition of matter, a compound having the following structural formula

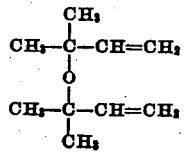

FRANK J. SODAY.